Jan. 8, 1952  J. A. NEWTON  2,582,060
VALVE ROTATING DEVICE
Filed Sept. 29, 1947  2 SHEETS—SHEET 1
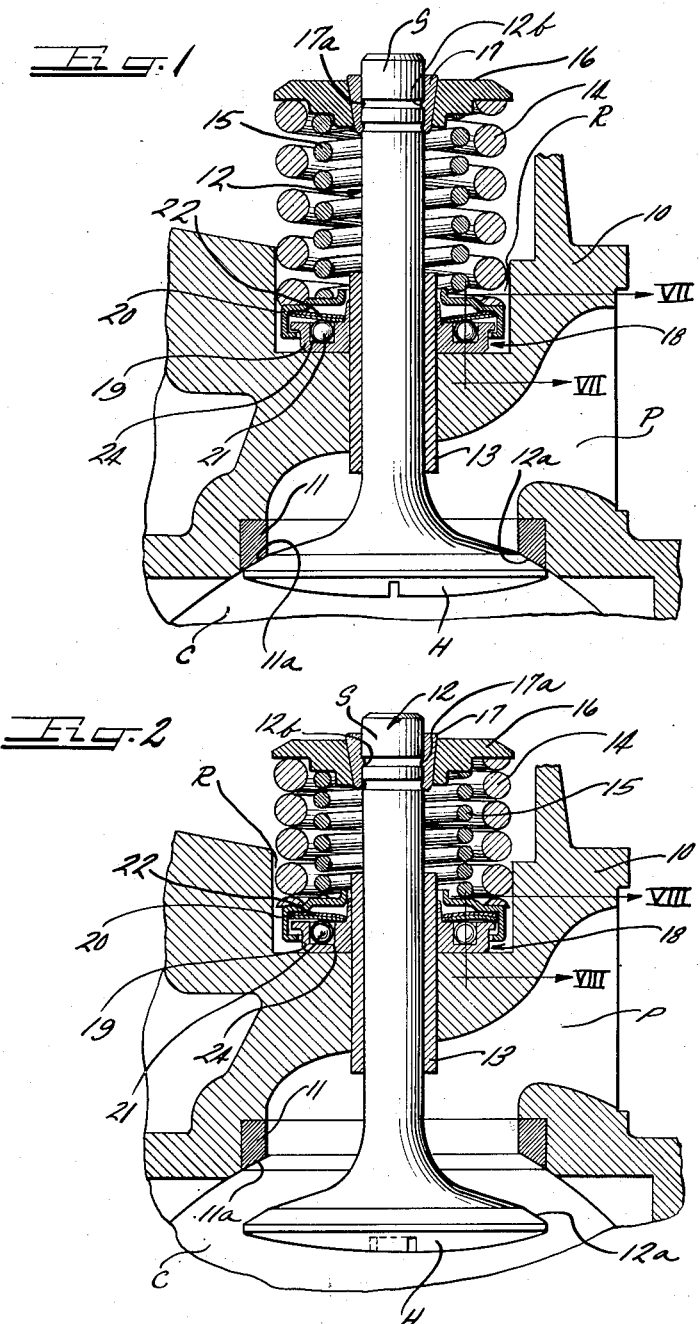
Inventor
JOHN A. NEWTON
by
Attys.

Jan. 8, 1952 J. A. NEWTON 2,582,060
VALVE ROTATING DEVICE
Filed Sept. 29, 1947 2 SHEETS—SHEET 2

Inventor
JOHN A. NEWTON
by
Attys.

Patented Jan. 8, 1952

2,582,060

UNITED STATES PATENT OFFICE 2,582,060

VALVE ROTATING DEVICE

John A. Newton, Painesville, Ohio, assignor to Thompson Products, Inc., Cleveland, Ohio, a corporation of Ohio Application September 29, 1947, Serial No. 776,637

9 Claims. (Cl. 123—90)

This invention relates to devices for rotating valves in accord with the cyclical operation thereof and specifically deals with a reversible readily installed compact self-contained unit for rotating poppet valves.

While the invention will be hereinafter specifically described in connection with devices for rotating poppet valves, it should be understood that the devices of this invention are not limited to any particular usage since they are capable of imparting rotating movements to any rotatable member and especially spring loaded rotatable members.

In accordance with the present invention an assembly including a retainer cap carrying shiftable elements such as balls, rollers, or the like, and a resilient member which will deflect under increased load is placed between the valve springs of a spring pressed poppet valve and the surface on which they seat so that the resilient member will deflect with increased load to transfer the spring load from a cap portion of the assembly to the shiftable elements, whereupon the load on the shiftable elements causes them to shift and produce relative rotation between a collar and the surface upon which the assembly is seated. The relative rotation of the collar causes the valve springs and the valve to rotate over a predetermined angular increment so that the cyclical operations of the valve cause successive valve rotations.

Further in accordance with the present invention the cap portion of the assembly is made to permit reversible operation by providing a plurality of dished grooves to receive the balls or other shiftable elements, each groove extending over a portion of an annular ring about the cap portion of the assembly and having a relatively deep central portion with relatively shallow edge portions. Springs are inserted to bias the balls or other shiftable elements towards one end of their respective grooves to cause the desired rotation when the load is shifted to them. To reverse the direction of rotation, it is merely necessary to shift the springs to bias the balls or other shiftable elements towards the opposite ends of their respective grooves.

Rotation of the poppet valves during operation of internal combustion engines and the like frees the valve seat and valve stem from carbon deposits and like deleterious substances and assures even wear of the valve seat and valve head. It is generally desirable, however, to rotate the valve in accord with the coiling of the valve springs and for this reason it is generally desirable to use a valve rotating device that may be operated in either direction.

It is accordingly an object of the present invention to provide a small compact self-contained reversible valve rotating device.

A more specific object of the present invention is to provide a self-contained reversible mechanism for insertion between the valve springs of a spring biased poppet valve and the surface upon which they seat to rotate the valve in accord with the cyclical operation thereof.

Another object of the present invention is to provide a self-contained valve-rotating mechanism in which one set of parts may be assembled during manufacture to rotate the valve in either direction without the need of manufacturing right hand and left hand parts for the separate rotations.

Other and further objects of the invention will be apparent to those skilled in the art from the following detailed description of the annexed sheets of drawings which, by way of a preferred example, illustrate one embodiment of the invention.

On the drawings:

Figure 1 is a vertical cross sectional view, with parts in elevation, of a poppet valve assembly equipped with one form of valve-rotating device according to this invention;

Figure 2 is a view similar to Figure 1, but illustrating the positions of the parts when the valve is in the opened position;

Figure 3:
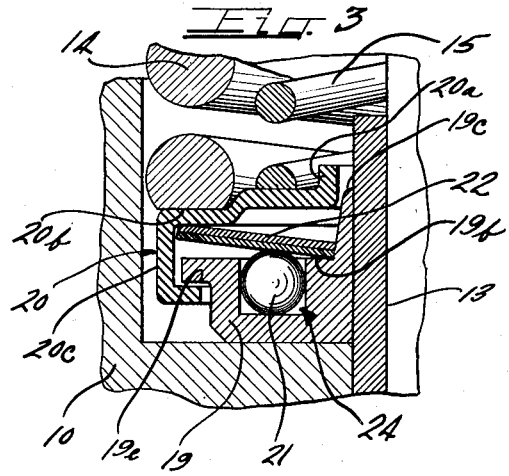
Figure 4:
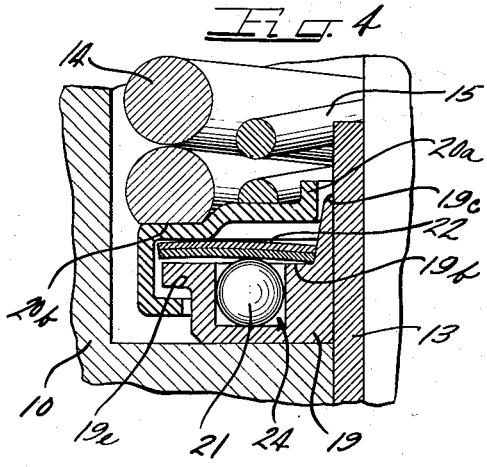
Figure 5:
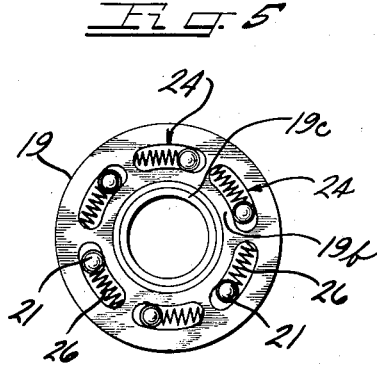
Figure 7:
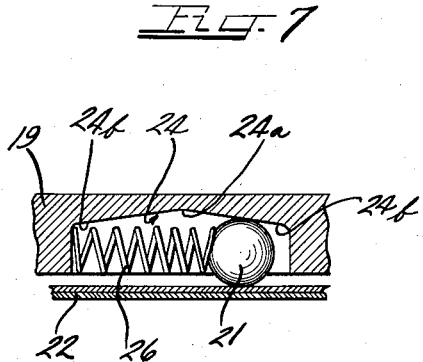
Figure 6:
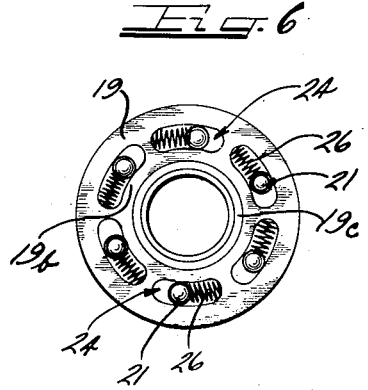
Figure 8:
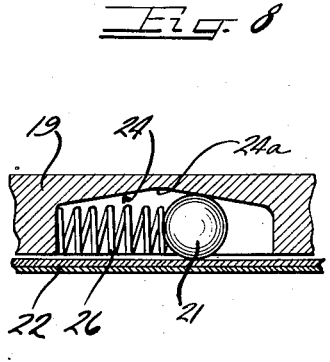

Figures 3 and 4 are fragmentary enlarged views of a portion of the assembly of Figures 1 and 2 and showing in greater detail the relative positions of the parts in Figures 1 and 2 respectively;

Figures 5 and 6 are top plan views of the cap portion of the assembly with the shiftable elements in the positions assumed under the conditions of Figures 1 and 2, respectively; and Figures 7 and 8 are fragmentary cross sectional views taken along axes VII—VII and VIII—VIII, Figures 1 and 3 respectively.

As shown on the drawings:

In Figures 1 and 2, the reference numeral 10 designates an engine part such as, for example, a portion of the cylinder head of a radial type aircraft engine. The engine part 10 defines a combustion chamber C and a port P, such as an exhaust port. A seat ring 11 is secured in the mouth of the port P and has a beveled seating face 11a facing the combustion chamber C. A poppet valve 12 has a head H for closing the port P, this head having beveled seating face 12a coacting with the seat 11a of the ring 11. The stem S of the valve 12 is slidably mounted in a stem guide 13 carried by the engine part 10. The stem guide 13 projects from the port P through a wall of the engine part into a recess R in the engine part 10. A heavy valve spring 14 and a lighter valve spring 15 nested in spring 14 are bottomed on the valve rotating assembly indicated at 18.

The valve stem S has the conventional retainer lock grooves 12b therearound near the tip end thereof and these grooves coact with the heads 17a of the retainer lock 17. The valve retainer 16 is locked to the valve stem and serves to seat the valve springs 14 and 15.

The valve-rotating assembly 18 is composed of a cap 19 resting on the engine part 10 and which is prevented from rotation by the frictional engagements therewith under the downward pressures exerted by the valve springs 14 and 15, a valve spring seating collar 20 acted on by the springs 14 and 15, a plurality of balls 21 carried in dished grooves 24 in the cap 19, and spring washers 22 between the cap and the spring collar arranged to deflect under increased spring loads such as those exerted when the valve is opened to transfer the spring load from the cap 19 to the balls 21 therein. The transferred load causes the balls to roll down the dished grooves toward the centers thereof and thereby rotates the washer 22 which, in turn, rotates the collar 20, the springs 14 and 15, and the valve 12.

The cap 19, shown in plan view in Figure 5, is of annular shape with an inner peripheral shoulder 19b to be abutted by the inner peripheral portion of the lowermost of the two spring washers 22. It also has a conical sleeve 19c having an inner bore to rest about the stem guide 13. Two superimposed spring washers 22 are illustrated, but it should be understood that one, or any number, can be used to obtain the desired degree of stiffness for deflecting or bowing radially over the balls 21 to transfer the load from the shoulder 19b to the balls only when the load of the springs 14 and 15 increases, as when the valve is opened.

The cap 19 is shaped to form a plurality of dished grooves or raceways 24, each groove occupying a segment of an annular ring about the cap surface as is shown in Figures 5 and 6. The grooves are dished by making them deeper at the center portions, 24a, Figure 7, than at the side or end portions, 24b, Figure 7. Each groove is made substantially of uniform width in the direction radial to the axis of the cap 19 and of such size as to accommodate and guide the balls 21 located therein. While a total of six grooves and a corresponding number of balls are shown in the particular structure of the figures, it will be understood that any number of grooves and balls may be used.

Each of the balls 21 is biased by a spring 26 toward one end of the groove 24 in which it rests. These springs seat at one end against the remote end of the groove and at the other end against the corresponding ball. They are fixed relative to the grooves so that when the annular ring formed by the grooves is traversed, all of the balls are biased in a common angular direction relative to the direction of traverse. Thus the balls all rotate in a common angular direction relative to the cap as the bias forces of the springs are overcome and tend to roll in a common angular direction under the action of the springs.

The valve spring seat collar 20 has a central aperture defined by turned-back wall portion 20a, Figure 3. The aperture freely receives the sleeve 19c of the cap 19. The turned-back wall portion 20a receives the inner spring 15 thereon. The collar has an end wall 20b on which the outer spring 14 is bottomed and under which the outer peripheral portion of the spring washer 22 bears. A downwardly extending skirt 20c of the collar 20 embraces the flange 19e of the cap 19.

From the foregoing descriptions it will be understood that when the poppet valve head is seated on the seat ring 11, so that the valve is in closed position, the load imposed on the valve rotating assembly 18 by the springs 14 and 15 is insufficient to bow or deflect the washer 22 over the balls 21 to take the major portion of the load off of the shoulder 19b of the cap 19. In this position the spring washers 22 transfer the load of the springs 14 and 15 from the valve spring seat collar 20 directly to the cap 19 and the coiled springs 26 urge the balls 21 to shallow end portions of each of the grooves 19d in a common angular direction until they snugly contact the spring washer.

The disposition of the various elements of the assembly when the valve 12 is in seated position is shown clearly in the views of Figures 1, 3, 5, and 7 all of which relate to this condition. From the enlarged view of Figure 3, for example, it will be evident that the spring washer 22 is substantially conical in shape in this condition and that the balls 21 rest against the under surface thereof under a relatively slight biasing force associated with the action of the biasing springs 26. In this condition the spring 22 is spaced from the bottom surface of the grooves 24 in the cap 19 by a relatively great distance as is shown in the cross sectional view of Figure 7 and the balls 21 are thereby forced relatively close to the ends of their respective grooves before being stopped by the wedge action of the bottom of the grooves 24 against the opposed surface of the spring washer 22.

When the poppet valve 12 is raised off of its seat to open the port P, the valve springs 14 and 15 are compressed and the load on the spring washer or washers 22 is increased beyond the flexing point of the washer. The washer then bows or deflects radially to bear heavily on the balls 21 and the inner peripheral portion of the washer only lightly engages the shoulder 19b of the retainer cap 19. The main load is thus transferred to the balls 21. When the spring load is transferred to the balls, they roll down into the deeper portions 24a of the grooves 24. Since the washer 22 is held against rotation with respect to collar 20 by the frictional forces thereagainst, the washer 22, collar 20, valve springs 14 and 15, and the valve 12 are all rotated relative to the engine part 10 and retainer 19.

The disposition of the various elements in the assembly when the valve 12 is depressed to the open position are shown clearly in Figures 2, 4, 6, and 8. From the enlarged cross sectional view of Figure 4, it will be evident that when the cap 20 is depressed, thereby flexing washer 22, the balls 21 intercept the normal surface assumed by the washer and thus take up load from the inner peripheral surface of cap 19. The washer 22 thereupon deviates from this normal path and assumes the relatively bowed shape shown in the figure. When the spring 22 assumes the shape shown in Figure 4, the surface thereof opposite the bottoms of the grooves 24 is relatively close thereto. This results from the fact that the pressure of the spring washer 22 bearing against the balls 21 causes them to roll in opposition to the biasing action of the springs 26 and ride towards the center of the grooves 24 as is shown in Figure 8. This rolling action causes the washer 22 to rotate relative to the cap 19 and thus causes the entire assembly to rotate as described above.

The provision of dished shaped grooves 24 in the cap 19 permits the apparatus to be quickly converted to rotate the valve 12 in either direction as the valve is depressed in accordance with the cyclical operation of the engine. To accomplish this, it is merely necessary to shift the springs 26 to the opposite side of each ball so that in the valve closed positions of Figures 1, 3, 5, and 7, the balls 21 are all shifted to the opposite sides of each groove 24. Subsequent pressure against the collar 20 associated with opening of the valve will then cause the balls to roll in the direction of the center of each of the grooves, which direction corresponds to rotation of the spring washer 22, the collar 20, springs 14 and 15 and the valve 12, in the opposite direction.

It should be understood from the above descriptions that this invention provides a compact, self-contained device for causing relative rotation of members upon being subjected to increased loads sufficient to deflect a resilient member which transfers the increased loads to shiftable elements arranged so that the thus transferred load thereon causes them rotatably to drive another part and which may be readily converted to accomplish rotation in either direction.

Alternatively, the valve rotating assemblies of this invention may be manufactured in self contained units not intended to be reversed in the field, in which case the same parts are used on all valves and economies of large scale production are achieved even though subsequent assemblies are made to form two separate types of mechanisms, one for rotation in each direction.

A valve rotating device having some features of similarity with the present reversible valve rotating device is described and claimed in the Ralston Patent 2,397,502 issued April 2, 1946, and assigned to the same assignee as the present invention.

It will, of course, be understood that various details of structure may be varied through a wide range without departing from the principles of this invention and it is, therefore, not the purpose to limit the patent granted hereon otherwise than necessitated by the scope of the appended claims.

I claim as my invention:

1. A reversible valve rotating device to rotatably drive a spring loaded poppet valve in response to increased loads resulting each time the valve is lifted off of its seat comprising a first part and a second part, said first part adapted to be connected to said poppet valve for co-rotation therewith, said second part adapted to be held against rotation, a deflectable spring member to normally engage both of said parts, said second part having inclined raceways circumferentially disposed therein, each of said raceways having a relatively deep central portion and inclined portions extending symmetrically therefrom, a shiftable element arranged to ride on one of said inclined portions of each of said raceways, and spring means acting on said shiftable elements to urge the shiftable elements in one direction against the deflectable spring member, said deflectable spring member arranged to transfer the normal valve spring load from said second part to said first part, said deflectable spring member being bowed under increased load whereupon the shiftable elements will transfer the increased load between said first and second part and said shiftable elements will be forced into the deeper parts of the inclined raceways to rotatably drive said first part and said valve, said spring means and said shiftable elements being reversibly disposable to said raceways and operable in the other direction to reverse the operation of said device.

2. A reversible valve rotating device for spring loaded poppet valve adapted to drive rotatively a poppet valve each time it is lifted off of its seat comprising a first part and a second part, said first part adapted to be connected to said poppet valve for co-rotation therewith, said second part adapted to be retained against rotation, a deflectable spring member normally engaging both of said parts to transmit normal valve spring loading between said first and second part, said second part having a plurality of circumferentially arranged recesses each having a relatively deep central portion with inclined raceways extending away therefrom, a ball in each recess arranged to ride on one of said inclined raceways, spring means acting on said balls to urge the same in one direction against said deflectable spring member, said deflectable spring member arranged to be bowed over said balls under increased valve spring loading, whereupon the balls will be forced into the deeper parts of the recesses on the inclined raceways to rotatably drive said first part and said valve, said spring means and said balls being reversibly disposable in said recesses and operable in the other direction to reverse the operations of said device.

3. A reversible valve rotating device for a poppet valve comprising a spring seat member arranged to be co-rotatable with said valve, a nonrotatable part adjacent said seat member and adapted to be seated on an engine part defining a seat for said valve, said part having a plurality of grooves forming an annulus in the surface facing said seat member, each of said grooves defining a substantially apexed raceway with a relatively deep central apex, shiftable elements disposed in said grooves, and spring seated against each of said shiftable elements and an edge of the corresponding groove to bias said shiftable element in a common angular direction relative to the center of said annulus and beyond the central apex of each groove, and a delectable spring washer connecting said seat and said stationary part when said valve is closed for moving said shiftable elements toward said central apex of each corresponding groove and to drive said member whenever said poppet valve is opened.

4. In combination with a stemmed poppet valve, a part slidably mounting the stem of said valve, and a coil spring secured on said valve stem to move the valve to the closed position, a reversible valve rotating device interposed between said valve and said part to receive the compressive forces of said spring, said device comprising a fixed member having a plurality of raceways forming an annulus about said stem, each of said raceways having a relatively deep central portion, balls in said raceways, springs urging said balls into the ends of said raceways in a common angular direction relative to the center of said ring, and a spring washer having one peripheral portion disposed to receive the said spring loads and another peripheral portion bottomed on said member to oppose said loads, said washer being arranged to engage said balls at an intermediate peripheral portion under increased valve spring loads for urging said balls into the deeper portions of said raceway thereby rotating said valve relative to said fixed member.

5. In combination with a stemmed poppet valve, a part slidably mounting the stem of said valve and having a seat portion about said stem, and a coil spring secured on said valve stem to move said valve to the closed position, a reversible valve rotating device interposed between said spring and said seat portion of said part to receive the compressive forces of said spring, said device comprising a fixed member resting on said seat portion and surrounding said stem and having a plurality of raceways forming an annulus about the surface thereof, each of said raceways having a relatively deep central portion, balls in said raceways, springs urging said balls into the ends of said raceways in a common angular direction relative to the center of said annulus, and a spring washer having an outer peripheral portion disposed to receive said spring loads and an inner peripheral portion bottomed on said member to oppose said loads, said washer being arranged to be deflected under increased valve spring loads for urging said balls into the deeper portions of said raceways thereby rotating said valve relative to said part.

6. A cap for use in a reversible device of the type wherein two members subject to increased loads are rotated relative to each other during said increased loads by transferring the load to shiftable balls, said cap comprising a disk having a plurality of grooves, each of said grooves defining a substantially apexed raceway with a relatively deep central apex to accommodate spring biased balls which may be selectively arranged in each of said raceways to shift towards said apex from either side thereof under increased pressure loads for rotating said members in a selected predetermined direction relative to one another.

7. A cap for use in a reversible device of the type wherein two members subject to increased loads are rotated relative to each other during said increased loads by transferring the load to shiftable balls, said cap comprising a disk having a plurality of grooves disposed to form an annulus, each of said grooves defining a substantially apexed raceway with a relatively deep central apex to accommodate spring biased balls which may be selectively arranged in each of said raceways to shift towards said apex from either side thereof under increased pressure loads for rotating said members in a selected predetermined direction relative to one another.

8. A cap for use with a reversible valve rotating device wherein a spring washer deflects under the increasing loads incident to opening said valve to transfer the load to shiftable balls and rotate said valve relative to the mounting part therefor, said cap comprising a disk having a plurality of grooves disposed to form an annulus, each of said grooves having a relatively deep central portion, said grooves adapted to accommodate spring biased balls which support said washer during said increasing loads and shift from the end portions of said grooves toward said central portion to rotate said members relative to each other, said cap further having a shoulder to support said washer when said increased loads are not exerted.

9. A cap for use with a reversible poppet valve rotating device wherein a spring washer deflects under the increasing loads incident to opening said valve to transfer the load to shiftable balls and rotate said valve relative to the mounting part therefor, said cap comprising a disk having a central opening freely to receive the stem of said valve and having a plurality of grooves disposed to form an annulus, each of said grooves defining a substantially apexed raceway with a relatively deep central apex to accommodate spring biased balls which may be respectively arranged in each of said raceways to shift towards said apex from either side thereof under increased pressure loads for rotating said members in a selected predetermined direction relative to one another, said cap further having an inner shoulder to support the inner periphery of said washer when said increased loads are not exerted.

JOHN A. NEWTON.

REFERENCES CITED

The following references are of record in the file of this patent:

UNITED STATES PATENTS

| Number | Name | Date |
| --- | --- | --- |
| 1,534,476 | Wirrer | Apr. 21, 1925 |
| 1,596,484 | Garlick | Aug. 17, 1926 |
| 2,397,502 | Ralston | Apr. 2, 1946 |